United States Patent
Kiuchi

(10) Patent No.: US 11,742,643 B2
(45) Date of Patent: Aug. 29, 2023

(54) CORRUGATED TUBE AND WIRE HARNESS

(71) Applicant: Yazaki Corporation, Tokyo (JP)

(72) Inventor: Masaru Kiuchi, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 425 days.

(21) Appl. No.: 16/894,651

(22) Filed: Jun. 5, 2020

(65) Prior Publication Data
US 2020/0389000 A1    Dec. 10, 2020

(30) Foreign Application Priority Data

Jun. 7, 2019   (JP) .................................. 2019-106690

(51) Int. Cl.
*H02G 3/04*       (2006.01)
*B60R 16/02*      (2006.01)

(52) U.S. Cl.
CPC ....... *H02G 3/0468* (2013.01); *B60R 16/0207* (2013.01); *B60R 16/0215* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,755,217 | B1* | 6/2004 | Yoshida | F16L 11/112 138/121 |
| 2003/0030197 | A1* | 2/2003 | Marks | F16L 57/00 267/136 |
| 2005/0274535 | A1* | 12/2005 | Koike | H02G 3/0468 174/481 |
| 2015/0027623 | A1* | 1/2015 | Malloy | B32B 37/1292 428/41.8 |
| 2015/0056388 | A1* | 2/2015 | Yamaguchi | F16L 57/06 87/8 |
| 2015/0237770 | A1* | 8/2015 | Yamasaki | H02G 3/0412 174/68.3 |
| 2016/0238166 | A1* | 8/2016 | Fukuda | B60R 16/0215 |
| 2016/0368436 | A1* | 12/2016 | Wakabayashi | B60R 16/0215 |
| 2017/0141553 | A1* | 5/2017 | Chu | F16L 11/118 |
| 2018/0109090 | A1* | 4/2018 | McDonald | H02G 3/0418 |
| 2018/0258321 | A1* | 9/2018 | Huo | C09J 7/35 |

FOREIGN PATENT DOCUMENTS

| | | | | |
|---|---|---|---|---|
| JP | 2000-287331 A | | 10/2000 | |
| JP | 2003160164 A | * | 6/2003 | ............... C09J 7/21 |
| JP | 2006-5983 A | | 1/2006 | |
| WO | 2018/123886 A | | 7/2018 | |

* cited by examiner

*Primary Examiner* — Paresh Paghadal
(74) *Attorney, Agent, or Firm* — KENEALY VAIDYA LLP

(57) ABSTRACT

A corrugated tube includes a tube body having a tubular shape and configured to accommodate an electric wire inside, and a protection layer laminated on the inner circumferential surface of the tube body. The tube body has a bellows-shaped region having projections and recesses axially alternately continuous, and includes two circumferential ends circumferentially formed, and is circumferentially closed by the two circumferential ends facing each other. The protection layer is laminated in end regions corresponding to the two circumferential ends, respectively, of the inner circumferential surface, and has a hardness lower than the hardness of the tube body.

10 Claims, 7 Drawing Sheets

AXIAL DIRECTION

CORRUGATED TUBE AND WIRE HARNESS

CROSS-REFERENCE TO RELATED APPLICATION(S)

The present application claims priority to and incorporates by reference the entire contents of Japanese Patent Application No. 2019-106690 filed in Japan on Jun. 7, 2019.

BACKGROUND OF THE INVENTION

1. Field of the Invention

The present invention relates to a corrugated tube and a wire harness.

2. Description of the Related Art

Corrugated tubes are used as an exterior member for externally protecting electric wires mounted in automobiles and the like.

In a corrugated tube, one slit is formed along the axial direction of a tube body, and an electric wire is inserted into the inside of the corrugated tube via the slit so that the electric wire is accommodated (see Japanese Patent Application Laid-open No. 2006-5983). The corrugated tube thus protects the electric wire.

In a corrugated tube, a slit is closed after the attachment of an electric wire, and, for example, when one of two ends circumferentially constituting the slit is radially shifted, an edge formed by one of opposed surfaces of the slit and the inner circumferential surface of the corrugated tube (hereinafter, also referred to as "the edge of the slit") sometimes protrudes inward. There is a possibility that, after the corrugated tube is mounted in a vehicle, the electric wire accommodated in the corrugated tube comes into contact with the edge of the slit due to vehicle vibration and the like, and the coating of the electric wire gets damaged. Furthermore, there is a possibility that, during attachment work for the electric wire, the electric wire comes into contact with the edge of the slit and the coating of the electric wire gets damaged.

SUMMARY OF THE INVENTION

The present invention has been made in view of the above-mentioned circumstances, and an object of the present invention is to provide a corrugated tube and a wire harness that are capable of substantially preventing damage caused by contact between an electric wire accommodated inside and the edge of a slit.

In order to achieve the above mentioned object, a corrugated tube according to one aspect of the present invention includes a tube body having a tubular shape and configured to accommodate an electric wire inside; and a protection layer laminated on an inner circumferential surface of the tube body, wherein the tube body has at least a bellows-shaped region having projections and recesses axially alternately continuous, includes two ends circumferentially formed, and is circumferentially closed by the two ends facing or overlapping each other, and the protection layer is laminated in at least end regions corresponding to the two ends, respectively, of the inner circumferential surface, and has a hardness lower than a hardness of the tube body.

According to another aspect of the present invention, in the corrugated tube, it is possible to configure that the protection layer is laminated in at least the bellows-shaped region of each of the end regions.

According to still another aspect of the present invention, in the corrugated tube, it is possible to configure that the hardness of the protection layer is not higher than a hardness of an outermost layer of the electric wire accommodated in the tube body.

According to still another aspect of the present invention, in the corrugated tube, it is possible to further include that a coating layer laminated on an outer circumferential surface of the tube body, wherein the coating layer is laminated in at least end regions corresponding to the two ends, respectively, of the outer circumferential surface, and has a hardness lower than the hardness of the tube body.

In order to achieve the above mentioned object, a wire harness according to still another aspect of the present invention includes the corrugated tube; and at least one electric wire accommodated in the corrugated tube.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, embodiments of a corrugated tube and a wire harness in the present invention will be described in detail with reference to the drawings. Note that the present invention is not limited to the following embodiments. In other words, constituents in the following embodiments include constituents that a person skilled in the art can easily assume or constituents that are substantially the same as the constituents, and can be variously omitted, replaced, and modified without deviating the scope of the present invention.

Embodiments

Figure 1:
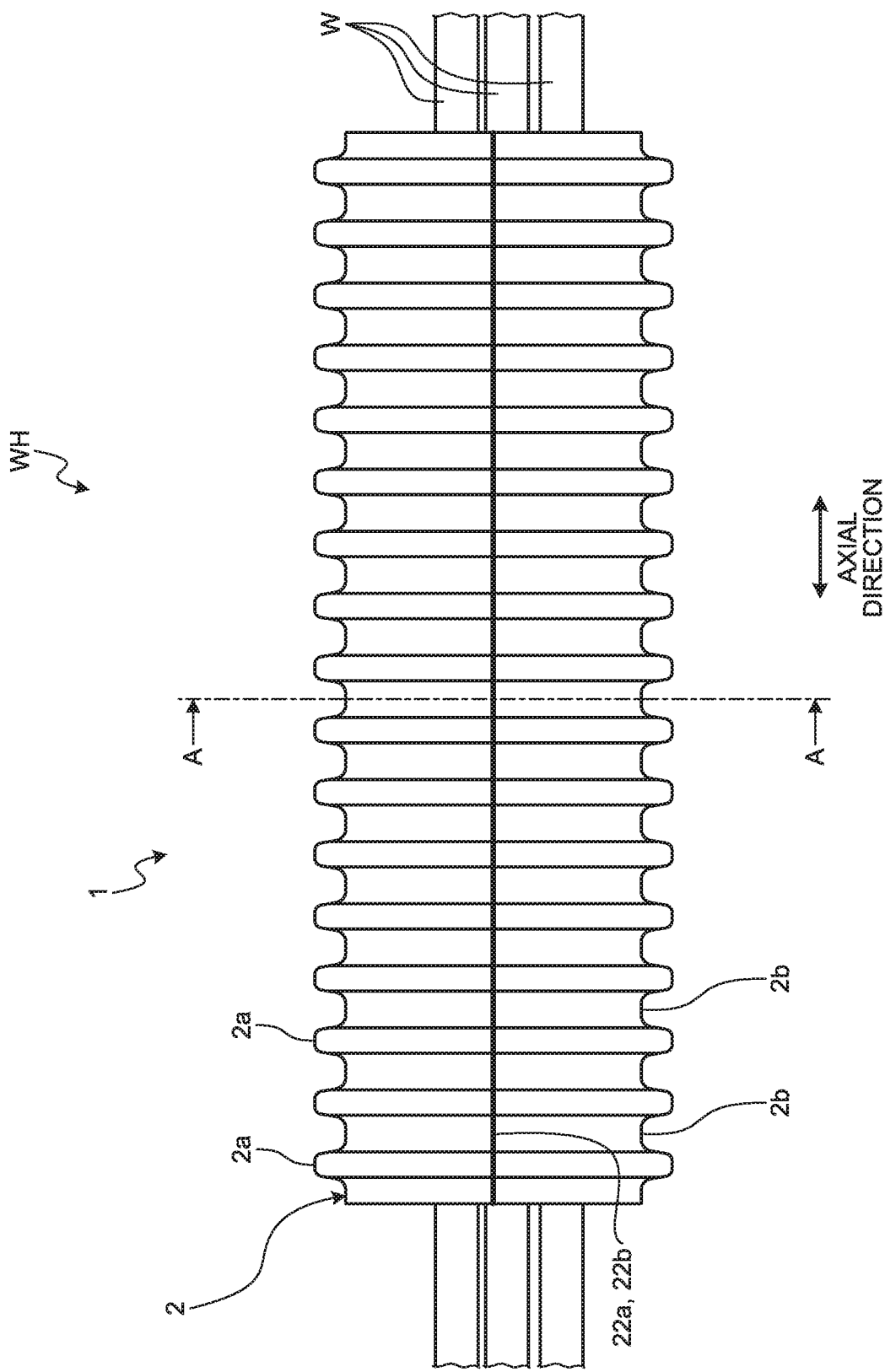
FIG. 1 is a plan view illustrating external appearances of a corrugated tube and a wire harness in one embodiment.
Figure 2:
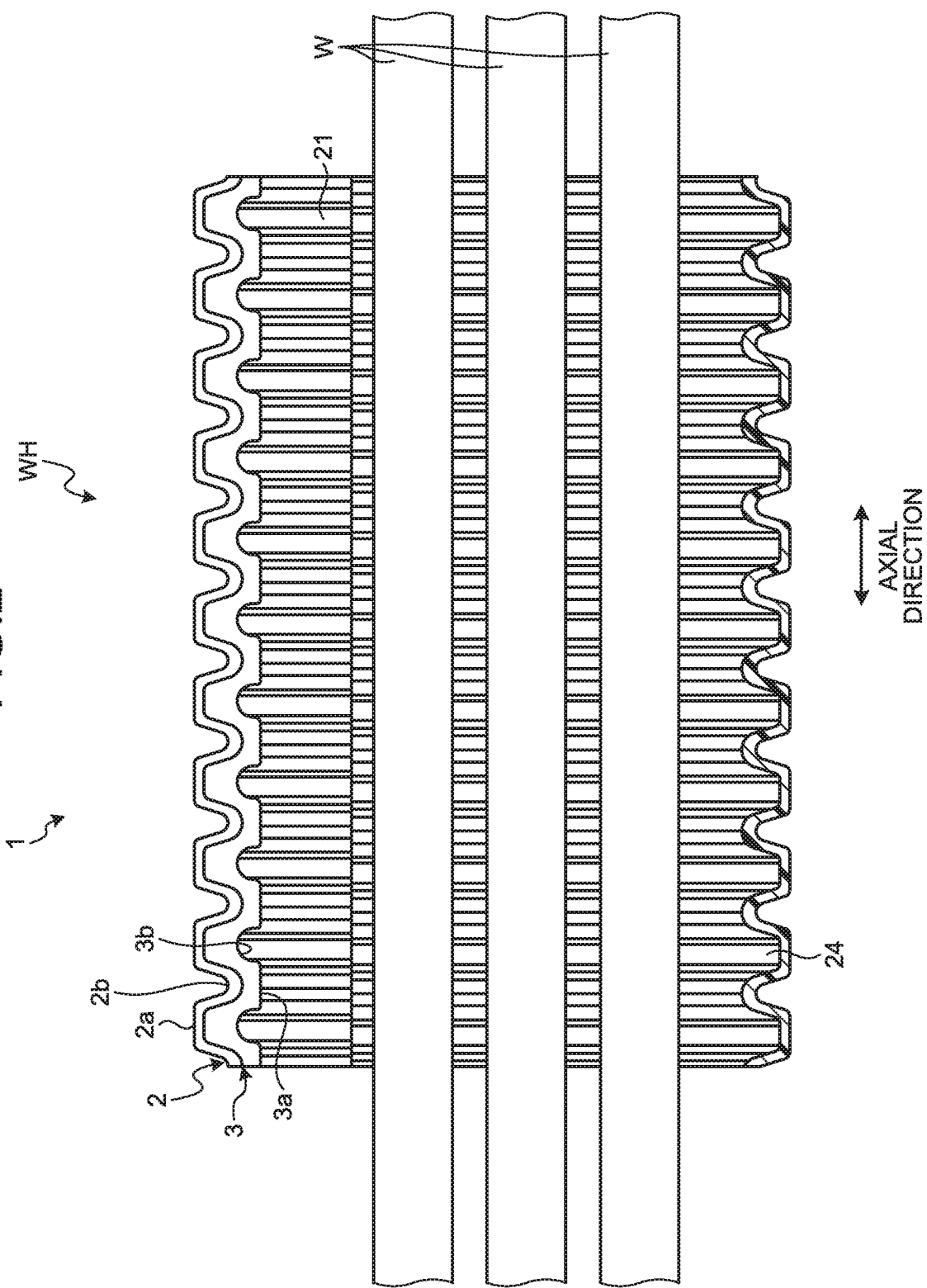
FIG. 2 is a radial cross-sectional view illustrating schematic configurations of the corrugated tube and the wire harness in the embodiment.
Figure 3:
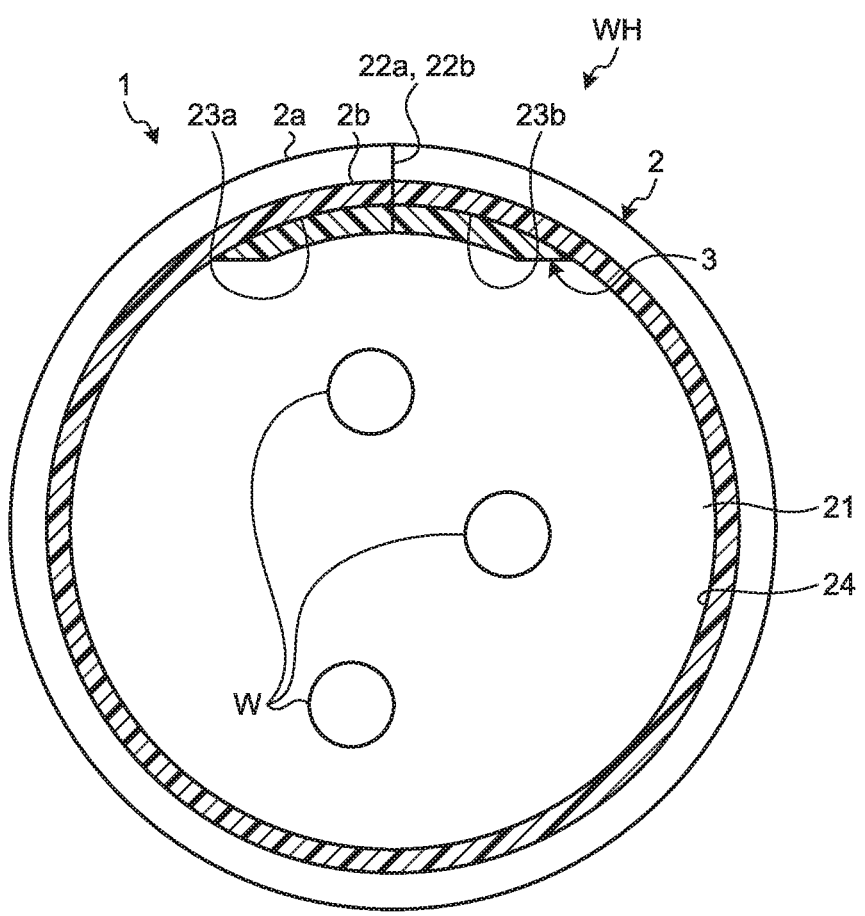
FIG. 3 is an axial cross-sectional view illustrating the schematic configurations of the corrugated tube and the wire harness in the embodiment.
Figure 4:
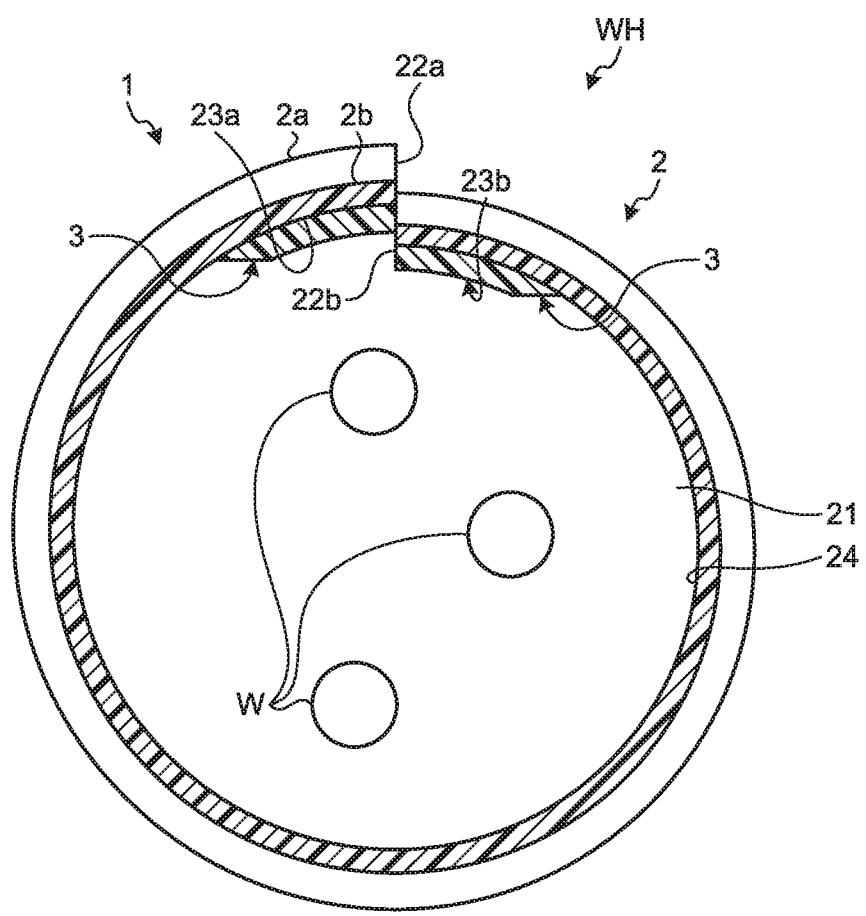
FIG. 4 is a radial cross-sectional view illustrating the schematic configurations of the corrugated tube and the wire harness in the embodiment.

A corrugated tube and a wire harness in an embodiment are now described. FIG. 1 is a plan view illustrating external appearances of a corrugated tube and a wire harness in the embodiment. FIG. 2 is a radial cross-sectional view illustrating schematic configurations of the corrugated tube and the wire harness in the embodiment. FIG. 3 is an axial cross-sectional view illustrating the schematic configurations of the corrugated tube and the wire harness in the embodiment. FIG. 4 is a radial cross-sectional view illustrating the schematic configurations of the corrugated tube and the wire harness in the embodiment. Here, FIG. 1 is a plan view obtained by viewing, from the radial direction, an opposed position at which two circumferential ends of a cylindrical tube body face each other. FIG. 2 (including FIG. 6) is a radial cross-sectional view obtained by cutting the tube body by a plane passing through the central axis of the tube body and the opposed position. FIG. 3 is a cross-sectional view taken along line A-A in FIG. 1, and illustrates a state in which the two circumferential ends of the tube body face each other. FIG. 4 illustrates a state in which the two circumferential ends of the tube body are in parallel.

A corrugated tube 1 in the present embodiment is used as an exterior member for externally protecting an electric wire W installed in a vehicle such as an automobile. The electric wire W is formed from one or a plurality of components each obtained by coating the outside of a conductor (core wire) including a plurality of conductive metal strands with an insulating coating. The coating of the electric wire W is laminated on the outermost layer of the electric wire W, for example. The corrugated tube 1 constitutes a wire harness WH, together with at least one electric wire W serving as a protection target. As illustrated in FIG. 1 to FIG. 4, the corrugated tube 1 includes a tube body 2 and a protection layer 3.

The tube body 2 is a part for accommodating the electric wire W inside. The tube body 2 is formed from an insulating resin material and has flexibility. The tube body 2 is molded from, for example, polypropylene-based resin, polyamide-based resin, or elastomer. As illustrated in FIG. 1 to FIG. 4, the tube body 2 is formed in a tube shape having an interior space 21, and is formed in a bellows shape in such a manner that projections 2a circumferentially projecting are axially arranged alternately with recesses 2b circumferentially recessed. The tube body 2 has a bellows-shaped region 4 formed in the bellows shape between one axial end and another axial end that are provided in the axial direction. When viewed from the axial direction, the tube body 2 of the present embodiment is annular in a pre-attachment state before the electric wire W is attached and a post-attachment state after the electric wire W is attached. The tube body 2 has two circumferential ends 22a and 22b that are provided in the circumferential direction.

The circumferential ends 22a and 22b are two ends circumferentially constituting a slit. Each of the circumferential ends 22a and 22b includes an edge (hereinafter, also referred to as "the edge of the slit") formed by a corresponding one of the circumferentially opposed surfaces and the inner circumferential surface of the tube body 2. Before and after the attachment of the electric wire W, the circumferential ends 22a and 22b face each other and thereby circumferentially come into contact with each other to close the interior space 21 (FIG. 3 and FIG. 4). For example, as illustrated in FIG. 3, before and after the attachment of the electric wire W, the circumferential ends 22a and 22b circumferentially come into contact with each other to close the interior space 21 in a state in which the inner circumferential surface continues. In this case, the circumferential ends 22a and 22b neither protrude radially inward nor protrude radially outward. In contrast, as illustrated in FIG. 4, before and after the attachment of the electric wire W, the circumferential ends 22a and 22b circumferentially come into contact with each other to close the interior space 21 in a state in which any one of the circumferential ends 22a and 22b protrudes radially inward (or radially outward). In this case, any one of the circumferential ends 22a and 22b protrudes radially inward, so that the edge of the slit appears in the inner circumferential surface of the tube body 2. When the electric wire W is inserted into the interior space 21 of the tube body 2, the tube body 2 is bent, so that the circumferential ends 22a and 22b becomes circumferentially separated to form an opening. The circumferential ends 22a and 22b face each other at an opposed position along the circumferential direction of the tube body 2. In some cases, before the attachment of the electric wire W, the circumferential ends 22a and 22b circumferentially come into contact with each other to close the interior space 21 in a state in which the inner circumferential surface continues, while after the attachment of the electric wire W, the circumferential ends 22a and 22b circumferentially come into contact with each other to close the interior space 21 in a state in which any one of the circumferential ends 22a and 22b protrudes radially inward (or radially outward).

The protection layer 3 is a part formed from an insulating resin material, and laminated on the inner circumferential surface of the tube body 2. The protection layer 3 is molded from, for example, polypropylene-based resin, polyamide-based resin, or elastomer. The protection layer 3 is laminated in end regions 23a and 23b corresponding to the circumferential ends 22a and 22b, respectively, of the inner circumferential surface. In other words, the protection layer 3 is laminated along the axial direction on the inner circumferential surface of the tube body 2, not over the whole circumference, but in each of the end region 23a including the circumferential end 22a and the end region 23b including the circumferential end 22b. The end regions 23a and 23b are regions of the inner circumferential surface of the tube body 2, other than a central region 24 in which the protection layer 3 is not laminated. The protection layer 3 is formed so as to fit the shape of the inner circumferential surface of the tube body 2. For example, the protection layer 3 is formed in the bellows shape in such a manner that projections 3a circumferentially projecting are axially arranged alternately with recesses 3b circumferentially recessed. The protection layer 3 is laminated so as to radially cover the edges of the circumferential ends 22a and 22b, that is, the edge of the slit. The hardness of the protection layer 3 is set lower than the hardness of the tube body 2 so as to prevent the coating of the electric wire W from being damaged due to contact between the protection layer 3 and the electric wire W when the protection layer 3 is laminated on the tube body 2. For example, the hardness of a resin material constituting the protection layer 3 is set lower than the hardness of a resin material constituting the tube body 2. In other words, the protection layer 3 is formed from a soft material having a lower hardness than the tube body 2. Furthermore, the hardness of the protection layer 3 is equal to or lower than the hardness of the coating of the electric wire W accommodated in the tube body 2 so as to prevent the coating of the electric wire W from being worn out due to contact between the protection layer 3 and the electric wire W.

Next, the assembly of the corrugated tube 1 in the present embodiment will be described. First, a worker makes one slit along the axial direction in the corrugated tube 1 formed by extruding from a mold corresponding to the tube body 2 and the protection layer 3, so that a pair of circumferential ends 22a and 22b is formed. Thus, the corrugated tube 1 becomes in a pre-attachment state. Next, for the corrugated tube 1 in the pre-attachment state, the worker circumferentially separates the circumferential ends 22a and 22b to form an opening, and inserts the electric wire W into the interior space 21 through the opening. Next, the worker installs the assembled corrugated tube 1 into, for example, an automobile, and electrically connects the electric wire W to, for example, a motor.

As described above, in the corrugated tube 1 and the wire harness WH of the present embodiment, the protection layer 3 is laminated in end regions 23a and 23b corresponding to the circumferential ends 22a and 22b, respectively, of the inner circumferential surface of the tube body 2. The hardness of the protection layer 3 is set lower than the hardness of the tube body 2. With the above-described configuration, even when one of the circumferential ends 22a and 22b is radially shifted and accordingly the edge, that is, an edge formed by the opposed surface of the circumferential end 22a or 22b and the inner circumferential surface of the tube body 2 protrudes inward, damage to the electric wire W due to contact between the electric wire W and the edge can be substantially prevented. Furthermore, compared with a case in which the protection layer 3 is laminated on the inner circumferential surface of the tube body 2 over the whole circumference, the whole weight of the corrugated tube 1 can be reduced, and production costs can be kept lower by reducing the cost of materials used for the protection layer 3.

In the corrugated tube 1 of the present embodiment, the protection layer 3 is laminated in the bellows-shaped region 4 of the end regions 23a and 23b. With this configuration, for example, even when the corrugated tube 1 is routed in a vehicle while being curved and accordingly the electric wire W radially moves in the interior space 21 and comes into contact with the edge of the slit, the electric wire W can be protected by the protection layer 3.

In the corrugated tube 1 of the present embodiment, the hardness of the protection layer 3 is equal to or lower than the hardness of the coating of the electric wire W accommodated in the tube body 2. With this configuration, the coating of the electric wire W can be substantially prevented from being worn out due to contact between the electric wire W and the protection layer 3, and the electric wire W can be surely protected.

Modifications

Figure 5:
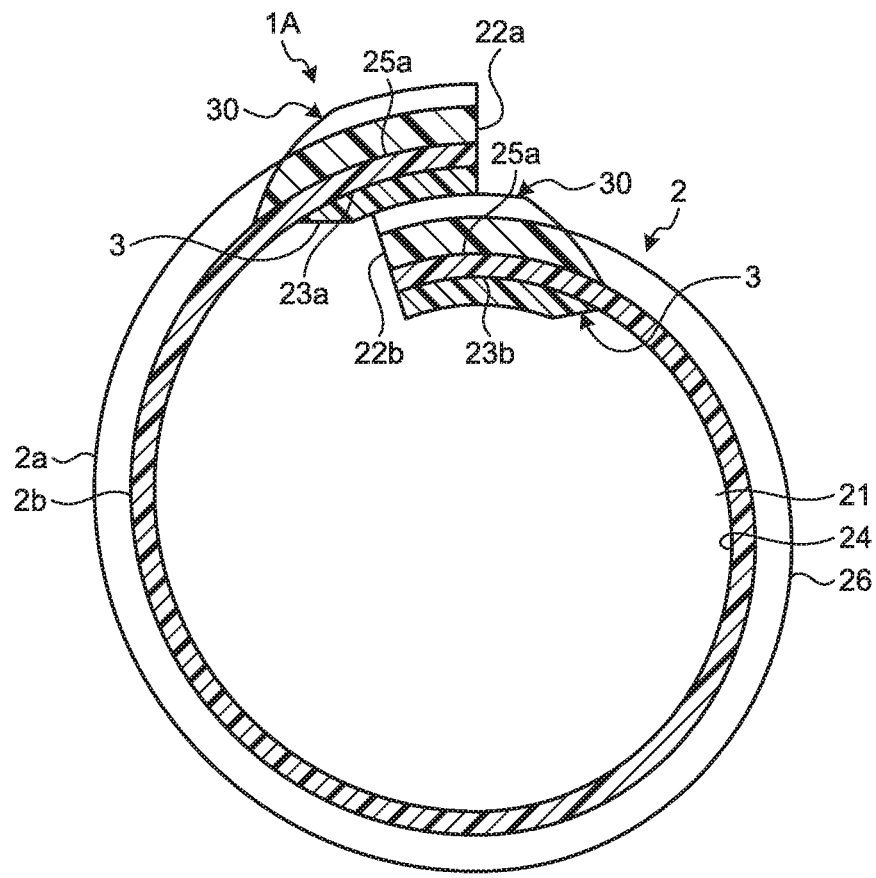
FIG. 5 is an axial cross-sectional view illustrating a schematic configuration of a corrugated tube in a first modification.
Figure 6:
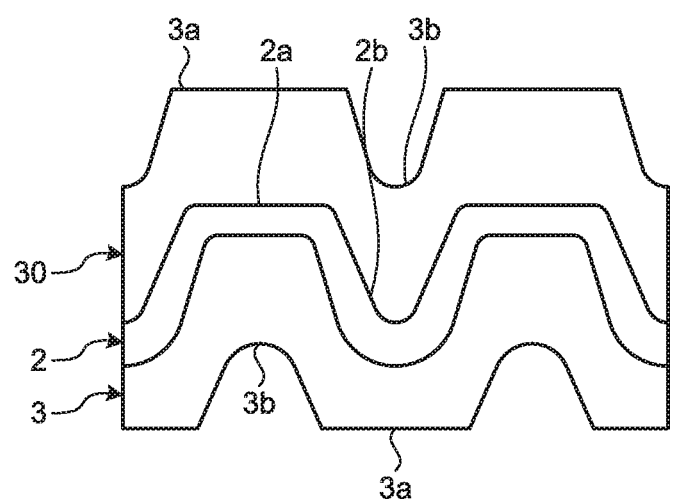
FIG. 6 is a radial cross-sectional enlarged view of a main part of the corrugated tube in the first modification.

The corrugated tube 1 in the above-described embodiment is configured such that the protection layer 3 is laminated on the inner circumferential surface of the tube body 2, but is not limited to this. FIG. 5 is an axial cross-sectional view illustrating a schematic configuration of a corrugated tube of a first modification. FIG. 6 is a radial cross-sectional enlarged view of a main part of the corrugated tube of the first modification. As illustrated in FIG. 5 and FIG. 6, a corrugated tube 1A of the first modification is different from the above-described corrugated tube 1 in the sense that the corrugated tube 1A includes a coating layer 30 laminated on the outer circumferential surface of the tube body 2, and the circumferential ends 22a and 22b radially overlap each other and thereby circumferentially close the interior space 21.

The corrugated tube 1A of the first modification further includes the coating layer 30 laminated on the outer circumferential surface of the tube body 2. As is the case in the above-described protection layer 3, the coating layer 30 is formed from an insulating resin material, and is laminated on end regions 25a and 25b corresponding to the two circumferential ends 22a and 22b, respectively, of the outer circumferential surface. In other words, the coating layer 30 is laminated along the axial direction on the outer circumferential surface of the tube body 2, not over the whole circumference, but in each of the end region 25a including the circumferential end 22a and the end region 25b including the circumferential end 22b. The end regions 25a and 25b are regions of the outer circumferential surface of the tube body 2, other than a central region 26 in which the coating layer 30 is not laminated. The coating layer 30 is formed to fit the shape of the outer circumferential surface of the tube body 2. For example, as illustrated in FIG. 6, the coating layer 30 is formed in the bellows shape in such a manner that projections 3a circumferentially projecting are axially arranged alternately with recesses 3b circumferentially recessed. The coating layer 30 is laminated so as to radially cover the edges of the circumferential ends 22a and 22b, that is, the edge of the slit. This edge is formed by the opposed surface of the circumferential end 22a or 22b, and the outer circumferential surface of the tube body 2. As is the case in the above-described protection layer 3, the hardness of the coating layer 30 is set lower than the hardness of the tube body 2 so as to prevent the coating of the electric wire W from being damaged due to contact between the coating layer 30 and the electric wire W even when the coating layer 30 is laminated on the tube body 2. For example, the hardness of a resin material constituting the coating layer 30 is set lower than the hardness of a resin material constituting the tube body 2. In other words, the coating layer 30 is formed from a soft material having a lower hardness than the tube body 2. Furthermore, the hardness of the coating layer 30 is preferably equal to or lower than the hardness of the coating of the electric wire W accommodated in the tube body 2 so as to prevent the electric wire W from being damaged due to radially sandwiching the electric wire W between the circumferential ends 22a and 22b and resulting in contact between the coating of the electric wire W and the coating layer 30.

In the corrugated tube 1A and the wire harness WH of the first modification, the coating layer 30 is laminated in end regions 25a and 25b corresponding to the circumferential ends 22a and 22b, respectively, of the outer circumferential surface of the tube body 2. The hardness of the coating layer 30 is set lower than the hardness of the tube body 2. With the above-described configuration, in the case where the tube body 2 is circumferentially closed by the circumferential ends 22a and 22b overlapping each other, for example, even when the electric wire W radially gets sandwiched during the attachment work of the electric wire W, the electric wire can be sandwiched by the protection layer 3 and the coating layer 30. As a result, the coating of the electric wire W can be substantially prevented from being damaged due to contact between the coating of the electric wire W and the edge of the slit, that is, an edge formed by the opposed surface of the circumferential end 22a or 22b and the outer circumferential surface of the tube body 2, so that the electric wire W can be protected.

Note that, in the first modification, the coating layer 30 is laminated in each of the end regions 25a and 25b, but is not limited to this, and may be laminated in any one of the end regions 25a and 25b. In this case, in a state in which the circumferential ends 22a and 22b radially overlap each other, the coating layer 30 is preferably laminated on a side located between the circumferential end 22a and the circumferential end 22b. For example, in the example illustrated in FIG. 5, the coating layer 30 is preferably laminated in the end region 25b corresponding to the circumferential end 22b, of the outer circumferential surface.

Figure 7:
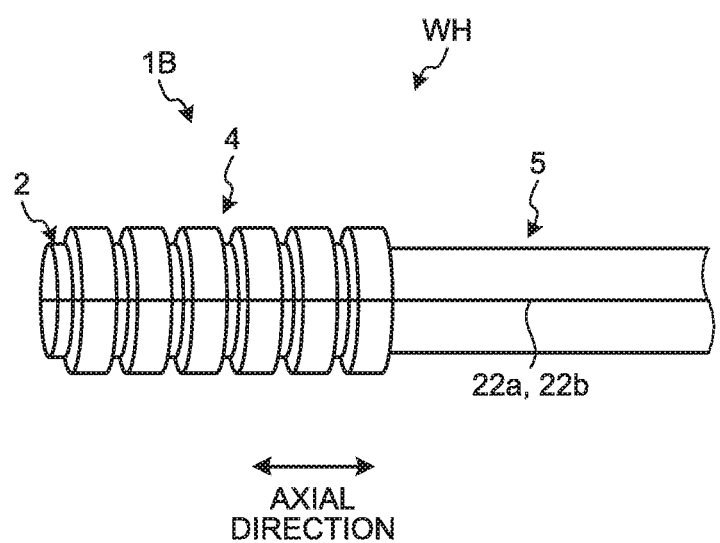
FIG. 7 is a plan view illustrating an external appearance of a corrugated tube in a second modification.
Figure 8A:
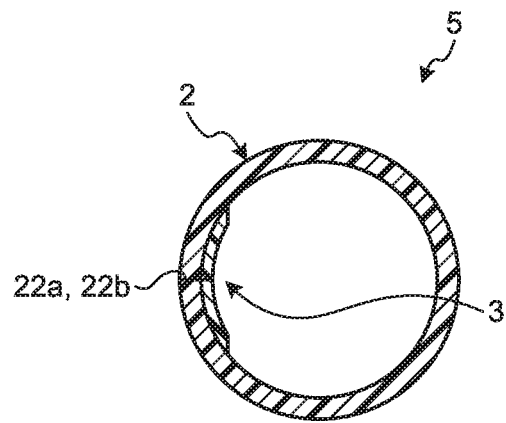
FIG. 8A is an axial cross-sectional view of a linear region illustrated in FIG. 7.
Figure 8B:
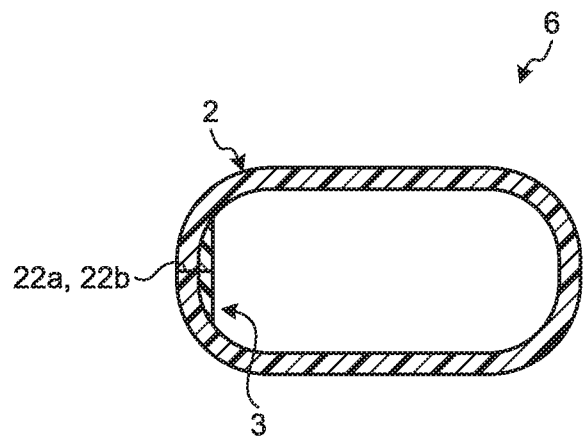
FIG. 8B is an axial cross-sectional view of a bellows-shaped region having a flat cross section and illustrated in FIG. 9.
Figure 9:
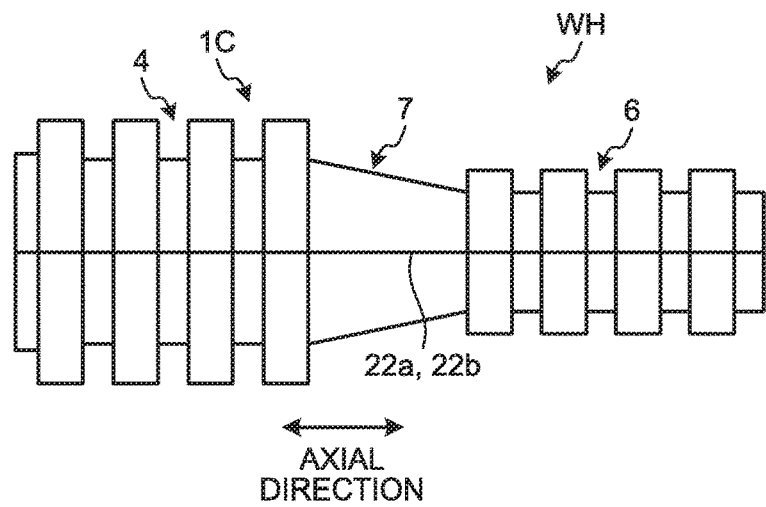
FIG. 9 is a plan view illustrating an external appearance of a corrugated tube in a third modification.

The corrugated tube 1 in the above-described embodiment is configured such that the tube body 2 is formed of the bellows-shaped region 4 having the bellows shape from one axial end to another axial end provided in the axial direction, but is not limited to this. FIG. 7 is a plan view illustrating an external appearance of a corrugated tube in a second modification. FIG. 8A is an axial cross-sectional view of a linear region illustrated in FIG. 7. FIG. 8B is an axial cross-sectional view of a bellows-shaped region having a flat cross section illustrated in FIG. 9. FIG. 9 is a plan view illustrating an external appearance of a corrugated tube in a third modification. A corrugated tube 1B of the second modification is different from the above-described corrugated tube 1 in the sense that the tube body 2 includes not only the bellows-shaped region 4 but also a linear region 5 along the axial direction.

As illustrated in FIG. 7, the corrugated tube 1B includes the bellows-shaped region 4 having a circular cross section and the linear region 5 having a circular cross section. The linear region 5 is different from the above-described bellows-shaped region 4 in the sense that the tube body 2 is not formed in the bellows shape. Hence, as illustrated in FIG. 8A, the linear region 5 is formed so as to have an annular shape when viewed from the axial direction. The corrugated tube 1B and the wire harness WH of the second modification include the tube body 2 having an annular cross-sectional shape (a tubular shape) and configured to accommodate the electric wire W inside, and the protection layer 3 laminated on the inner circumferential surface of the tube body 2. The tube body 2 has at least a linear region linearly extending along the axial direction. The tube body 2 includes the two circumferential ends 22a and 22b circumferentially formed, and is circumferentially closed by the two circumferential ends 22a and 22b facing or overlapping each other. The protection layer 3 is laminated in at least the end regions 23a and 23b corresponding to the two circumferential ends 22a and 22b, respectively, of the inner circumferential surface of the tube body 2, and the hardness of the protection layer 3 is lower than the hardness of the tube body 2. With the above-described configuration, the same effect as in the corrugated tube 1 of the above-described embodiment can be achieved.

A corrugated tube 1C of the third modification is different from the above-described corrugated tube 1 in the sense that the tube body 2 includes not only the bellows-shaped region 4, but also a bellows-shaped region 6 having a flat cross section, along the axial direction.

As illustrated in FIG. 9, the corrugated tube 1C includes the bellows-shaped region 4 having the circular cross section, the bellows-shaped region 6 having the flat cross section, and a coupling region 7. As illustrated in FIG. 8B, the bellows-shaped region 6 having the flat cross section is formed so as to have a flat shape when viewed from the axial direction. The coupling region 7 illustrated in FIG. 9 is a region for coupling the bellows-shaped region 4 having the circular cross section with the bellows-shaped region 6 having the flat cross section, in which the tube body 2 is not formed in the bellows shape and the diameter of the tube body 2 changes from one side towards another side in the axial direction. In other words, when viewed from the axial direction, the shape of the coupling region 7 axially changes into a circular or a flat shape. The corrugated tube 1C and the wire harness WH in the third modification include the tube body 2 having a flat cross section and configured to accommodate the electric wire W inside, and the protection layer 3 laminated on the inner circumferential surface of the tube body 2. The tube body 2 has at least a bellows-shaped region in which projections and recesses are axially alternately continuous. The tube body 2 is circumferentially provided with the two circumferential ends 22a and 22b, and is circumferentially closed by the two circumferential ends 22a and 22b facing or overlapping each other. The protection layer 3 is laminated in at least the end regions 23a and 23b corresponding to the two circumferential ends 22a and 22b, respectively, of the inner circumferential surface of the tube body 2. The protection layer 3 and the circumferential ends 22a and 22b in the bellows-shaped region 6 having the flat cross section of the third modification are provided, for example, on the minor-axis side of the inner circumferential surface of the tube body 2 (FIG. 8B). The hardness of the protection layer 3 is preferably lower than the hardness of the tube body 2. With the above-described configuration, the same effect as in the corrugated tube 1 of the above-described embodiment can be achieved. Note that the protection layer 3 and the circumferential ends 22a and 22b in the bellows-shaped region 6 having the flat cross section are provided on the minor-axis side of the inner circumferential surface of the tube body 2, but are not limited to this, and may be provided on the major-axis side of the inner circumferential surface, or may be provided at any place of the inner circumferential surface.

Figure 10:
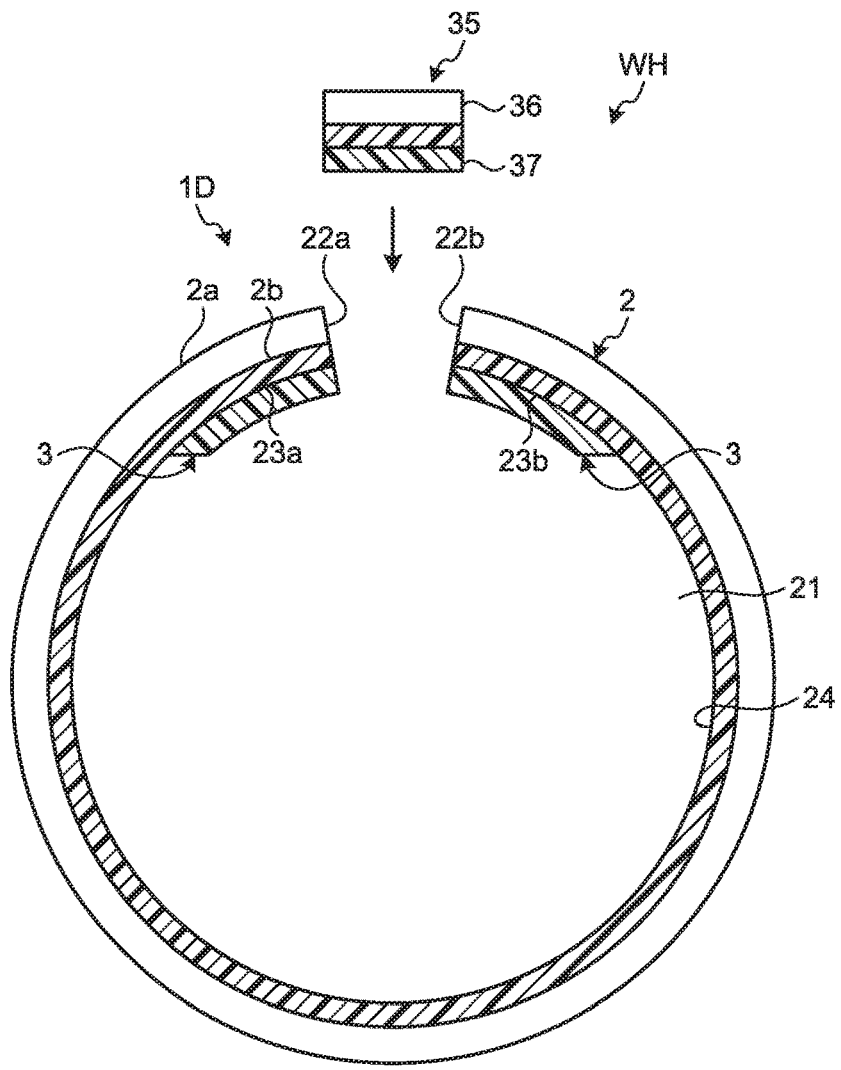
FIG. 10 is an axial cross-sectional view illustrating a schematic configuration of a corrugated tube in a fourth modification.

The corrugated tube 1 of the above-described embodiment is configured such that the tube body 2 is circumferentially provided with the two circumferential ends 22a and 22b, and is circumferentially closed by the two circumferential ends 22a and 22b facing or overlapping each other, but, the corrugated tube 1 is not limited to this configuration. FIG. 10 is an axial cross-sectional view illustrating a schematic configuration of a corrugated tube in a fourth modification. A corrugated tube 1D of the fourth modification is different from the above-described corrugated tube 1 in the sense that the corrugated tube 1D further includes a lid 35 configured separately from the tube body 2, and the lid 35 gets inserted between the two circumferential ends 22a and 22 to close the interior space 21.

The corrugated tube 1D includes the tube body 2, the protection layer 3, and the lid 35. The lid 35 includes a lid main body 36 and a protection layer 37. The lid main body 36 is formed from the same resin material used for the tube body 2, and has flexibility. The protection layer 37 is formed from the same resin material used for the protection layer 3 and the coating layer 30, and the hardness of the protection layer 37 is set lower than the hardness of the tube body. The protection layer 37 is laminated on the inner circumferential surface of the lid main body 36.

Note that, in the above-described modification, the protection layer 3 and the circumferential ends 22a and 22b are provided in the linear region 5 having the circular cross section, on the inner circumferential surface of the tube body 2, but are not limited to this, and may be provided in an unillustrated linear region having a flat cross section, on the inner circumferential surface of the tube body 2 or may be provided in an unillustrated linear region having an elliptical cross section, on the inner circumferential surface of the tube body 2.

The corrugated tube and the wire harness according to the present embodiments are capable of substantially preventing damage caused by contact between an electric wire accommodated inside and the edge of a slit.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A corrugated tube, comprising:
a tube body having a tubular shape and configured to accommodate an electric wire inside;
a protection layer laminated on an inner circumferential surface of the tube body; and
a coating layer laminated on an outer circumferential surface of the tube body, wherein
the tube body has at least a bellows-shaped region having projections and recesses axially alternately continuous, includes two ends circumferentially formed, and is circumferentially closed by the two ends facing or overlapping each other,
the protection layer is laminated in two end regions corresponding to the two ends, respectively, of the inner circumferential surface, terminates in each of the end regions in a circumferential direction of the tube body so that a central region of the inner circumferential surface is not laminated with the protection layer, and has a hardness lower than a hardness of the tube body, and
the coating layer is laminated in at least end regions corresponding to the two ends, respectively, of the outer circumferential surface, and has a hardness lower than the hardness of the tube body.

2. The corrugated tube according to claim 1, wherein the protection layer is laminated in at least the bellows-shaped region of each of the end regions.

3. The corrugated tube according to claim 1, wherein the hardness of the protection layer is not higher than a hardness of an outermost layer of the electric wire accommodated in the tube body.

4. The corrugated tube according to claim 2, wherein the hardness of the protection layer is not higher than a hardness of an outermost layer of the electric wire accommodated in the tube body.

5. A wire harness, comprising:
the corrugated tube according to claim 1; and
at least one electric wire accommodated in the corrugated tube.

6. A wire harness, comprising:
the corrugated tube according to claim 2; and
at least one electric wire accommodated in the corrugated tube.

7. A wire harness, comprising:
the corrugated tube according to claim 3; and
at least one electric wire accommodated in the corrugated tube.

8. A wire harness, comprising:
the corrugated tube according to claim 4; and
at least one electric wire accommodated in the corrugated tube.

9. A corrugated tube comprising:
a tube body having a tubular shape and configured to accommodate an electric wire inside;
a protection layer laminated on an inner circumferential surface of the tube body; and
a coating layer laminated on an outer circumferential surface of the tube body, wherein
the tube body has at least a bellows-shaped region having projections and recesses axially alternately continuous, includes two ends circumferentially formed, and is circumferentially closed by the two ends overlapping each other, and
the protection layer is laminated in two end regions corresponding to the two ends, respectively, of the inner circumferential surface, terminates in each of the end regions in a circumferential direction of the tube body so that a central region of the inner circumferential surface is not laminated with the protection layer, and has a hardness lower than a hardness of the tube body,
the coating layer is laminated in at least end regions corresponding to the two ends, respectively, of the outer circumferential surface, and has a hardness lower than the hardness of the tube body, and
a portion of the protection layer is stacked on and abuts a portion of the coating layer.

10. The corrugated tube according to claim 9, wherein the coating layer terminates in each of the end regions of the outer circumferential surface in a circumferential direction of the tube body so that a central region of the outer circumferential surface is not laminated with the coating layer.

* * * * *